United States Patent [19]
Derighetti et al.

[11] Patent Number: 4,778,973
[45] Date of Patent: Oct. 18, 1988

[54] WIRE GUIDANCE ARRANGEMENT FOR GUIDING A WIRE ELECTRODE OF A SPARK EROSION MACHINE

[75] Inventors: Rene Derighetti, Losone; Karl Tobler, Maggia, both of Switzerland

[73] Assignee: AG fur Industrielle elektronik AGIE Losone, Losone, Switzerland

[21] Appl. No.: 871,105

[22] Filed: Jun. 5, 1986

[30] Foreign Application Priority Data

Jun. 7, 1985 [DE] Fed. Rep. of Germany ........ 3520540

[51] Int. Cl.[4] .............................................. B23H 7/10
[52] U.S. Cl. .................... 219/69 W; 204/206
[58] Field of Search ............... 219/69 E, 69 W, 69 R, 219/69 G; 204/206, 224 M

[56] References Cited

U.S. PATENT DOCUMENTS

| | | | |
|---|---|---|---|
| 2,066,588 | 1/1937 | Taylor | 219/69 W |
| 3,564,188 | 2/1971 | Dathe | 219/69 W |
| 4,123,645 | 10/1978 | Shichida et al. | 219/69 W |
| 4,193,852 | 3/1980 | Inoue | 219/69 W |
| 4,233,486 | 11/1980 | Inoue | 219/69 W |
| 4,333,806 | 6/1982 | Inoue | 219/69 W |
| 4,367,390 | 1/1983 | Balleys et al. | 219/69 W |
| 4,485,288 | 11/1984 | Schneider | 219/69 E |
| 4,605,834 | 8/1986 | Inoue | 219/69 W |
| 4,629,856 | 12/1986 | Inowe | 219/69 W |
| 4,686,344 | 8/1987 | Nakayama | 219/69 W |

FOREIGN PATENT DOCUMENTS

| | | | |
|---|---|---|---|
| 61-8223 | 1/1986 | Japan . | |
| 315557 | 10/1971 | U.S.S.R. | 219/69 W |
| 774891 | 10/1980 | U.S.S.R. | 219/69 M |
| 270158A | 8/1983 | U.S.S.R. | 219/69 W |

OTHER PUBLICATIONS

Article, "Multihead Wire-EDM Cuts Parts in Stacks", from American Machinist, p. 39, Apr. 1984.

Primary Examiner—A. D. Pellinen
Assistant Examiner—Geoffrey S. Evans
Attorney, Agent, or Firm—Helfgott & Karas

[57] ABSTRACT

A wire guidance arrangement for guiding a wire electrode of a spark erosion machine has several replaceable wire guides, which are mutually spaced to thereby form individual erosion zones. The individual wire guides are held by spring tension in corresponding openings of a guide plate, which rest on a base block. The common plane of the guide plate and the base block forms a reference plane on which are axially centered the undersides of wire guidance members of the individual wire guides. Even in the case of a greater wire electrode fixing length, this always ensures a satisfactory guidance of the wire electrode. In addition, the individual wire guides can be simply replaced without any adjustment being necessary.

25 Claims, 5 Drawing Sheets

WIRE GUIDANCE ARRANGEMENT FOR GUIDING A WIRE ELECTRODE OF A SPARK EROSION MACHINE

BACKGROUND OF THE INVENTION

The present invention related generally to spark erosion technology and more particularly to a wire guidance arrangement used in a spark erosion machine.

SUMMARY OF THE INVENTION

If it is wished to simultaneously work several identical parts on a conventional wire cutting machine, because there is the advantage that the machine will only have to be set up once and the working times become shorter, the problem arises that the distance between the wire guide at the inlet and the wire guide at the outlet of the erosion section becomes very large. This has a negative influence on the working precision of the apparatus.

Accordingly, it is a primary object of the present invention to improve the wire guidance arrangement in such a way that a precise, simultaneous utilization of several identical parts is possible.

It is another object of this invention to provide apparatus that makes it possible to replace the wire guidance elements simply and without any special adjustment being necessary.

One important principle of the present invention is to support and guide the wire electrode a number of times at several different, spaced apart locations over the erosion section. When including the wire guides on the inlet and outlet side, according to the present invention, at least three wire guides are present. Preferably, there are two wire guides for each workpiece, the number of guides only being one greater than the number of workpieces.

A feature of this invention is that the individual wire guides can easily be replaced and also be accurately aligned or adjusted, without any fine adjustment being required. A precise alignment in the plane of the guide plate is obtained by structure that will be disclosed hereinafter.

A simple replacement and reliable "fixing" of the wire guides results from the novel spring construction of the present invention. This type of spring can be produced by working the guide plate in a spark erosion machine.

Another object of this invention is to provide unique means that will ensure a problem free insertion of the wire electrode leads to the wire electrode being better fixed.

A further object of the present invention is to provide means that will result in a better guidance and, consequently, an improved vibration absorption of the wire electrode at the inlet-and outlet-side ends.

Still another feature of this invention is the provision of structure that permits a greater depth of cut and also the working of larger workpieces.

It is an additional object of the present invention to provide a self-centering wire guide permitting a problem free insertion of the wire electrode.

A specific object of the present invention is to provide apparatus within the guide plate and consequently the base lock that can be kept potential-free, so that there are no undesired voltage surges between workpiece and wire guide or guide plate.

A constructionally simple arrangement of an electrically insulated wire guide member that provides this feature is described hereinafter.

Further objects of this invention are to provide means that ensure an exact adjustment of the wire guides at right angles to the wire electrode as well as to provide means that ensure a simple flushing of the cutting gap.

Still other objects of the present invention are to provide means that result in a reliable guidance of the wire electrode, even if non-linear cuts are made, while also permitting easy adaptation to different workpiece thicknesses.

A further object of this invention is to provide apparatus wherein several cuts can be made simultaneously on each workpiece while several parts are simultaneously cut.

Briefly, and in its broadest aspect, the present invention provides a wire guidance arrangement for guiding a single wire electrode of a spark erosion machine, in which several workpieces are simultaneously cut by means of the one wire electrode, comprising a plurality of longitudinally spaced wire guides for guiding the wire electrode in the erosion zone.

BRIEF DESCRIPTION OF THE DRAWINGS

In the various figures of the drawings, like reference characters designate like parts.

In the drawings.

DETAILED DESCRIPTION OF THE PREFERRED EMBODIMENTS

Figure 1:
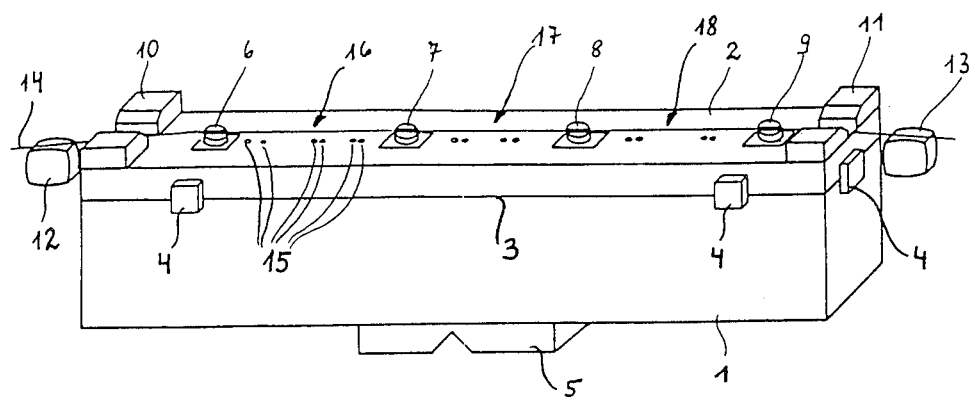
FIG. 1 is a perspective view of a wire guidance arrangement according to the present invention.

FIG. 1 shows a base block 1, which is positioned and fixed to the spark erosion machine with a conventional positioning and fixing system 5. On the top side of this base block is fixed a guide plate 2, the top of block 1 and the bottom of guide plate 2 forming a common reference plane 3. The guide plate 2 is centered on the base block 1 by centering means 4 and is fixed by screws (not shown). For simplification of illustration, centering means are shown only on two sides of the base block 1.

Several wires guide 6, 7, 8, 9 are arranged in the longitudinal direction of the guide plate 2 and are spaced from one another along a straight line. On either side of the two wire guides 6 and 9 there are precentering units 10 and 11 at the inlet and outlet side, respectively. Power supply units 12 and 13 are provided at the guide plate inlet and outlet sides and supply the wire electrode 14 with the electric power required for spark erosion.

In the embodiment according to FIG. 1, the four wire guides 6, 7, 8 and 9 are precisely located on a straight line, in which the wire electrode 14 is also positioned.

Opposite to the wire electrode 14 on the guide plate 2 are provided flushing holes 15 enabling the supply and/or removal of the liquid required for spark erosion. The flushing holes 15 issue into passages (not shown) in the base block 1, which can be arranged therein in such a way that only a single pressure and/or suction connection is required. Thus, the base block 1 also serves as a flushing liquid distributor.

Between the individual pairs of wire guides 6 and 7, 7 and 8 and 8 and 9 are formed three working zones 16, 17 and 18, whereby one or several workpieces can be worked in each of the zones.

The mutual spacing of adjacent wire guides is dependent on the thickness of the workpieces to be worked and on the desired cutting accuracy. When a high degree of cutting accuracy is desired, the spacings between adjacent wire guides will be made only slightly larger than the workpiece thickness. On the other hand, when limited accuracy requirements are made, two or more workpieces can be cut between two adjacent wire guides.

Figure 2:
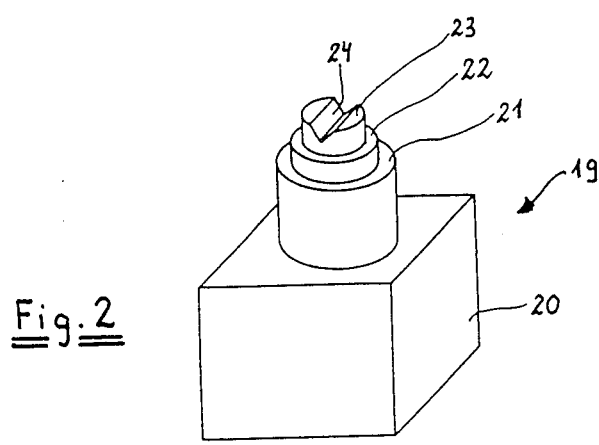
FIG. 2 is a perspective view of a wire guidance member according to one embodiment of the present invention.
Figure 3:
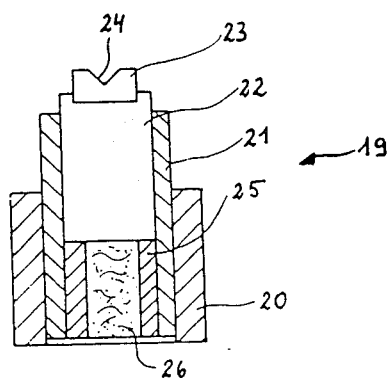
FIG. 3 is a sectional elevational view through the wire guidance member shown in FIG. 2.

FIGS. 2 and 3 are perspective and sectional elevational views of an individual wire guidance member 19 which forms one of the wire guides 6, 7, 8 and 9 of FIG. 1. The wire guidance member 19 of FIGS. 2 and 3 has a square body 20 which, as will be described in detail in conjunction with FIG. 4, can be inserted in the guide plate 2 of FIG. 1. The body 20 has a central, circular opening therethrough, in which is inserted a tubular or sleeve-like insulating member 21, part of whose axial length projects upwardly from the body 20. The insulating body 20 is fixed, e.g. by a press fit or by bonding in the passage opening of the body 20. Within insulating member 21 is held a cylindrical reception member 22, which is provided on its upper end face with a mounting support for a guidance member 23. The latter is made from any suitable, well known, wear-resistant material and is provided on its upwardly facing end with a V-shaped groove 24, in which the wire electrode 14 is adapted to be guided.

In the embodiment shown best in FIG. 3, the lower end face of the reception member 22 is supported on a further tubular or sleeve-like insulating member 25, whose outer surface engages the inwardly directed face of the insulating member 21. In addition, the interior of the insulating member 25 is filled with any well known insulating material 26, in order to ensure a completely satisfactory insulation in the downwards direction and to prevent the penetration of electrolytic flushing liquid.

As shown in the first embodiment, the two insulating member 21 and 25, as well as the insulating member 26 terminate above the base surface of the body 20. This ensures that only the underside of the body 20 forms a "reference plane". The lower ends of the insulating members 21 and 25 and the insulating material 26 are located above said plane. This permits a precise alignment or orientation of the wire guidance member 19 with respect to the guide plate 2 and the base block 1, because the wire guidance member 19 is so inserted in the guide plate 2 that the downwardly directed face of the body 20 is located in the reference plane 3 (FIG. 1).

Figure 4:
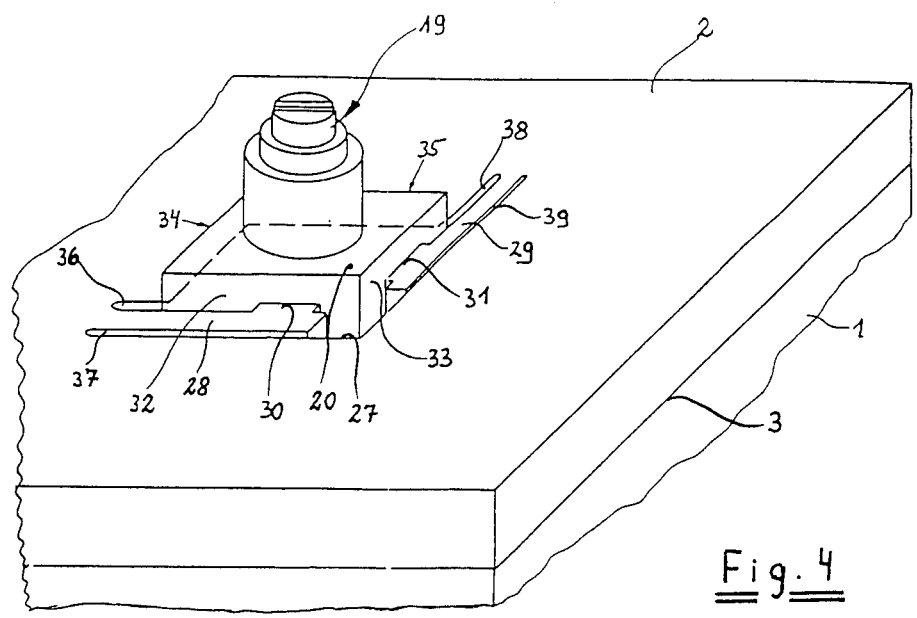
FIG. 4 is a fragmentary perspective representation illustrating typical means for securing the wire guidance member shown in FIGS. 2 and 3 to a guide plate.

FIG. 4 illustrates means for fixing the wire guidance member 19 to the guide plate 2, which has an opening 27 therethrough that is shaped to the contour of the body 20. Two adjacent lateral faces 34 and 35 of the body 20 engage correspondingly oriented faces of the opening 27. The two other lateral faces 32 and 33 of the body 20 are resiliently urged by spring members 28 and 29 in the direction of the faces 34 and 35. The two faces 34 and 35 serve as reference faces ensuring a clearly defined positioning of the wire guidance member 19 in the plane of the guide plate 2. In the vertical direction, i.e. at right angles to the plane of the guide plate 2, the alignment of the wire guidance member 19 is obtained, as described, by the underside of the body 20 being passed through an opening 27 to such an extent that it rests on the base block 1 or the reference plane 3.

The spring members 28 and 29 are, in each case integrated, in one piece into the guide plate 2, in that spring arms in one piece with the guide plate 2 are cut out of the latter by cuts 36 and 37 and 38 and 39, which can take place by cutting erosion. The spring arms are substantially parallel to the faces 32 and 33 and are provided in the vicinity of their ends with pressure surfaces 30 and 31, which, respectively, press against the face 32 and 33 of the body 20. These pressure surfaces 30 and 31 are consequently inwardly directed projections of the spring arms. The length of the spring arms is made such that their pressure surfaces 30 and 31 engage approximately centrally on the respective faces 32 and 33 of the body 20. Their length is also made such that the desired spring load deflection curve is obtained. The spring arms extend laterally beyond the base surface of the opening 27 for this purpose, namely by the length of cuts or slits 36 and 38.

This arrangement enables the wire guidance members 19 to be simply changed without any adjustment being necessary. The reference faces 34 and 35 and the V-groove 24 of the guidance member 23 must be accurately located in their mutual spatial position, as must the total height of the wire guidance member 23.

Figure 5:
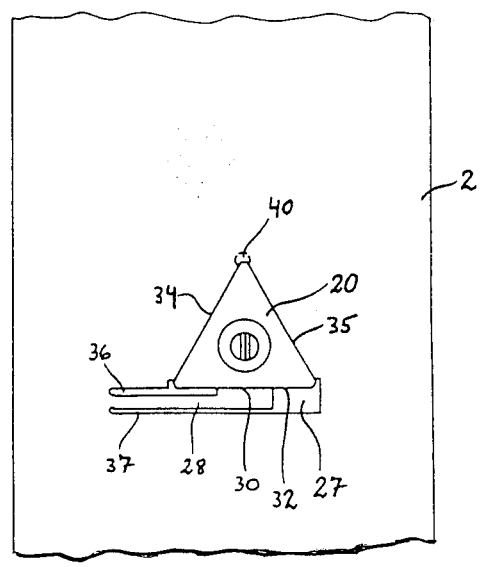
FIG. 5 is a plan view of a triangular wire guidance member secured to a guide plate.

A modification or variant of the shape of the body 20 and the opening 27 of guide plate 2 is shown in FIG. 5. Both are constructed in a triangular manner here, so that only one spring member 28 is required, which presses the body 20 against the reference faces 34 and 35, which are at an acute angle to one another. So that there is no adjustment problem, for example as a result of dirt, in the vicinity of the "tips" between the reference faces 34 and 35, the opening 27 is provided with an enlarged portion 40, so that the tip or apex of the triangular body 20 does not engage the guide plate 2. The triangle of the body 20 and the opening 27 can be either an isosceles or an equilateral triangle.

Figure 6:
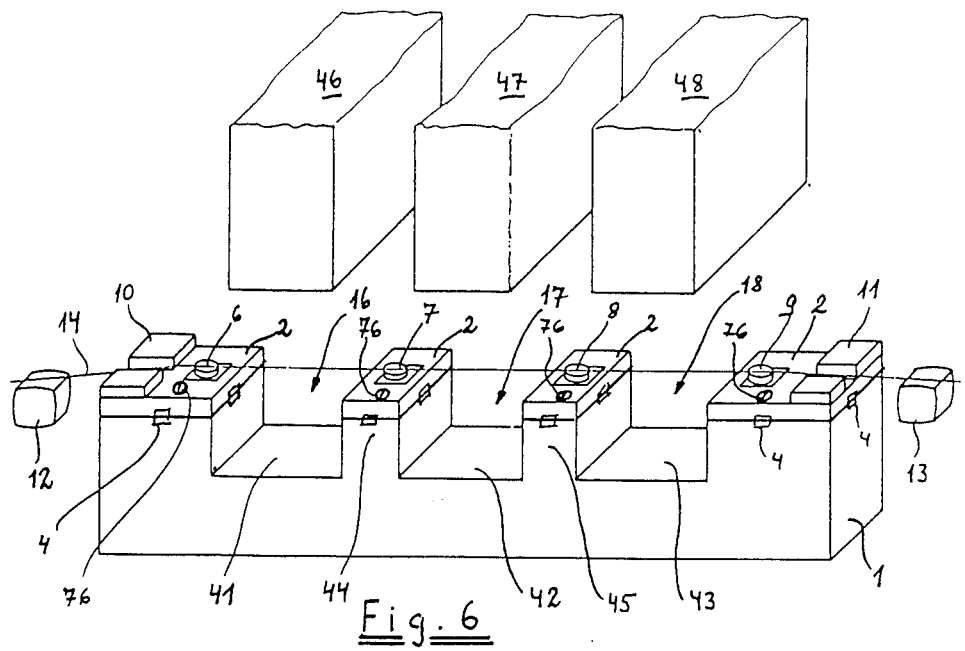
FIG. 6 is a perspective view, similar to FIG. 1, of a wire guidance arrangement according to a further embodiment of the present invention.

FIG. 6 shows another variant of the present invention in a perspective representation similar to FIG. 1. Unlike the embodiment of the FIG. 1, between adjacent wire guides 6 and 7 or 7 and 8 or 8 and 9, depressions 41, 42 and 43 are cut from the material of the guide plate 2. This permits an increase in the depth of cut. The central wire guides 7 and 8 are consequently held on webs 44 and 45. The guide plate 2 is then subdivided into several portions which are, in each case, fastened to the webs 44 and 45 and the lateral projections of the base plate 1 by means of screws 76, for example.

Figure 6A:
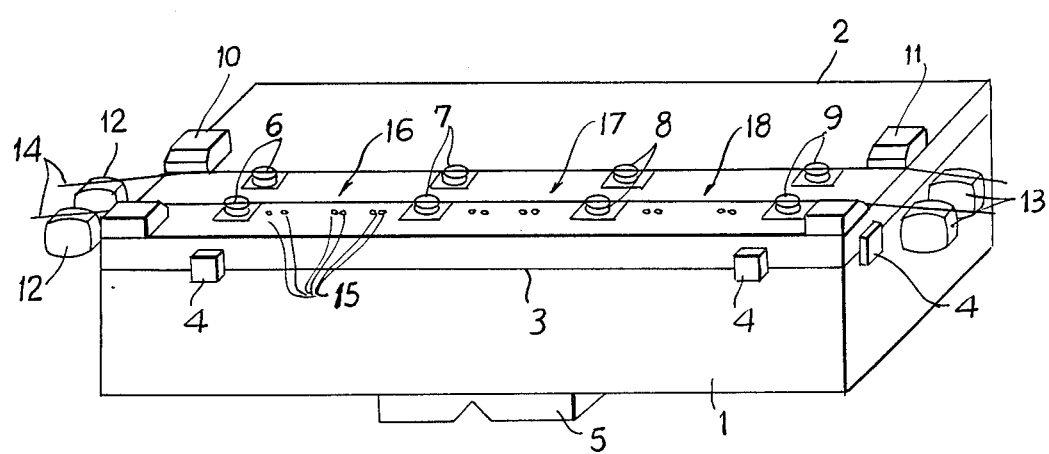
FIG. 6a is a view similar to FIG. 6 which employs parallel wire electrodes.

FIG. 6a illustrates a modification of the structure shown in FIG. 6 which uses two or more parallel wire electrodes 14.

Figure 7:
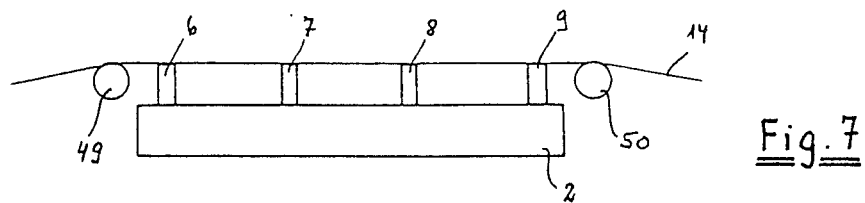
FIGS. 7 to 9 are schematic and diagrammatic side views of wire guidance arrangements according to additional embodiments of the present invention.
Figure 8:
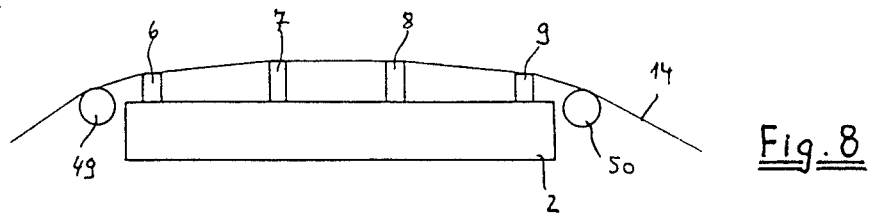
Figure 9:
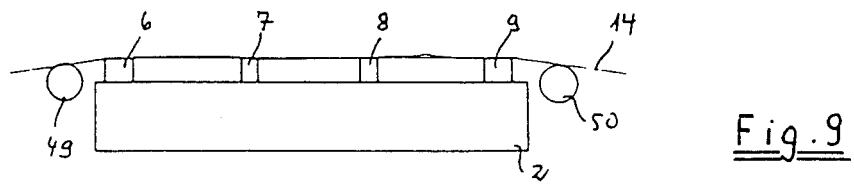

FIGS. 7, 8 and 9 illustrate further developments of the present invention. In FIG. 7 all four wire guides 6, 7, 8 and 9 shown are of the same height, so that throughout the working zone the wire electrode exactly forms a straight line. In addition, the guide rollers 49 and 50 at the inlet and outlet sides are aligned in such a way that the wire electrode 14 has a linear orientation with respect thereto.

However, in FIG. 8, the two central wire guides 7 and 8 are higher than the wire guides 6 and 9 on the inlet and outlet sides and latter are, in turn, higher than the wire guidance rollers 49 and 50. Thus, the wire electrode 14 is better secured in the individual erosion sections.

In the embodiment of FIG. 9, all the wire guides 6, 7, 8 and 9 are once again located on one line, while the wire guidance rollers 49 and 50 are somewhat below this line. In addition, the two wire guides 6 and 9 on the inlet and outlet sides are longer (on the longitudinal direction of the electrode) than the two central wire guides 7 and 8.

Figure 10:
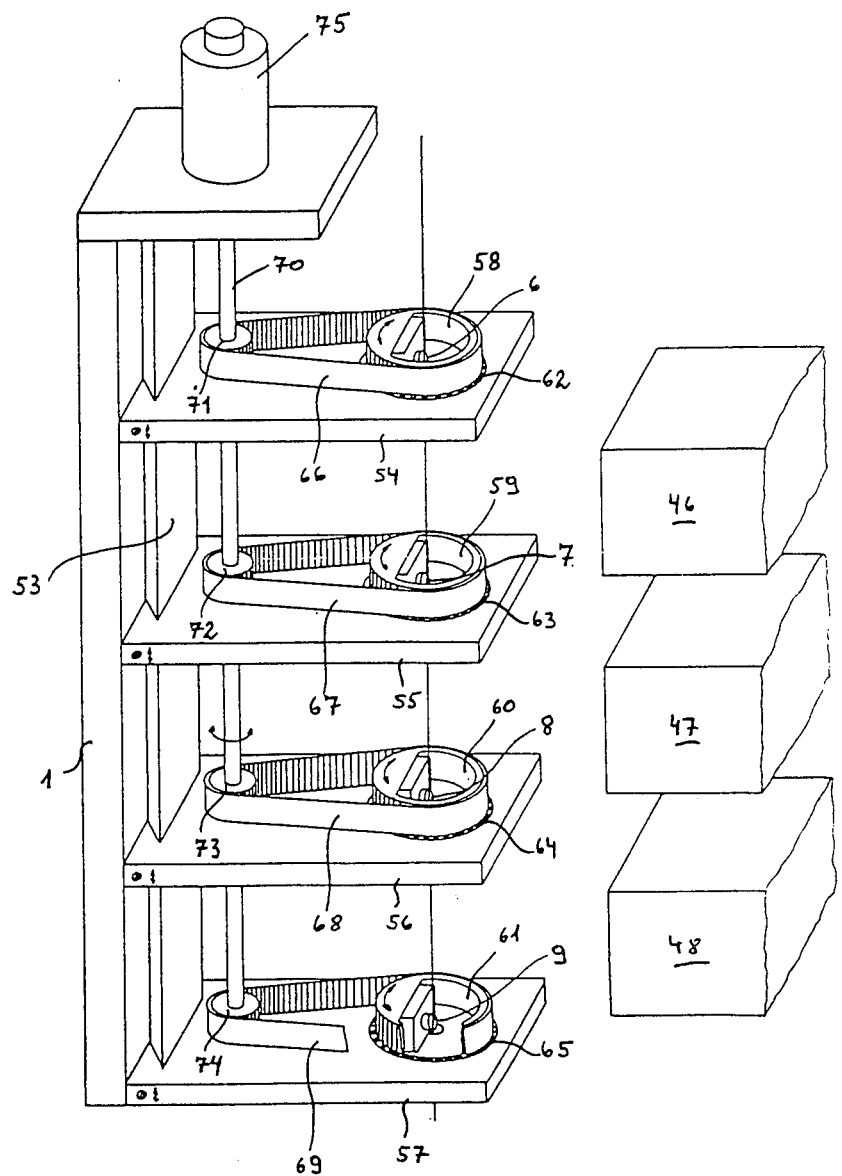
FIG. 10 is a perspective view of further embodiment of the present invention illustrating rotary wire guides.

FIG. 10 illustrates another embodiment of this invention, in which the individual wire guides 6, 7, 8 and 9 are oriented towards the particular cutting direction. For this purpose the individual wire guides 6, 7, 8 and 9 are fixed in rotary drums 58, 59, 60 and 61 and are so aligned within their respective drums that the "tip" of the V-groove 24 (FIG. 3) is located in the rotation center of the respective drum.

Each drum 58, 59, 60 and 61 is mounted in a rotary manner on a respective supporting plate 54, 55, 56 and 57 by means of a bearing 62, 63, 64 and 65, respectively, and can be rotated by means of a drive element 66, 67, 68 and 69, respectively, which can be a toothed belt. The particular wire guide and consequently its V-groove 24 is aligned in such a way that, independently of the cutting direction, the wire electrode 14 is always pressed into the groove 24. The individual drive elements are driven by a common shaft 70 and, specifically, by driving gears 71, 72, 73 and 74, respectively, connected in a non-rotary manner to the shaft 70. The shaft 70 is driven by a motor 75, which can be an electric stepping motor.

The supporting plates 54, 55, 56 and 57 are, in the FIG. 10 embodiment, held on the base plate 1 by means of a dovetail guide 53. It is then also possible to modify the mutual spacing of the supporting plates 54, 55, 56 and 57, and therefore the wire guides 6, 7, 8 and 9. This obviously requires that the driving gears 71 to 74 are displacable along the common shaft together with the particular supporting plate by means of a groove and tongue joint, a screw connection or a tooth system. This arrangement increases the possible uses of the machine, because on the one hand it is possible to adapt to different workpiece thicknesses and on the other hand the cutting direction can also be varied at random while simultaneously ensuring a perfect guidance and supporting of the wire electrode 14.

There has been disclosed heretofore the best embodiments of the invention presently contemplated. However, it is to be understood that various changes, modifications and improvements may be made hereto without departing from the spirit of the invention.

What is claimed is:

1. A wire guidance arrangement for guiding a single wire electrode of a spark erosion machine, in which several workpieces are simultaneously cut by means of the one wire electrode, comprising a plurality of longitudinally spaced wire guides for guiding the wire electrode in the erosion zone, wherein each wire guide comprises a wire guidance member having a body with planar side walls, a guide plate having an opening the surface of which correspond to the contour of the body in such a way that each body engages on two planar centering surfaces of the opening and wherein each body is pressed against the centering surfaces by means of a spring.

2. A wire guidance arrangement according to claim 1, wherein suction or pressure flushing holes for a flushing liquid are provided in the guide plate.

3. A wire guidance arrangement according to claim 2, wherein channels for suction or pressure flushing are provided in the base block and issue into flushing holes of the guide plate.

4. A wire guidance arrangement according to claim 3, wherein the channels in the base block are distributed in such a way that only one suction or pressure connection is required for flushing all erosion zones.

5. A wire guidance arrangement according to claim 1, wherein the body is rectangular in cross section.

6. A wire guidance arrangement according to claim 1, wherein the body is triangular in cross section.

7. A wire guidance arrangement according to claim 1, wherein each spring is formed in one piece from the material of the guide plate.

8. A wire guidance arrangement according to claim 7, wherein each spring is constructed as a spring arm extending substantially parallel to the face to be subjected to the action of the spring tension.

9. A wire guidance arrangement according to claim 8, wherein at the free end of the spring arm there is provided a pressure surface projecting in the direction of the opposing surface of the body and whose surface dimension is smaller than the opposing surface dimension of the body in contact with the spring.

10. A wire guidance arrangement according to claim 8, wherein the spring arm is longer than half the longitudinal side of the surface of the body in contact with the spring, the pressure surface of the spring engaging roughly in the center of the opposing surface of the body.

11. A wire guidance arrangement according to claim 1, wherein the guide plate between two adjacent wire guides has a recess.

12. A wire guidance arrangement for guiding a single wire electrode of a spark erosion machine comprising:
a first plurality of wire guides spaced apart longitudinally along a common straight line, the first plurality being equal to a number N where N is an integer having a minimum value of 3, said single wire electrode being disposed in all of said guides and extending therebetween along said line;
a second plurality of working erosion zones, the second plurality being equal to the number (N−1), the first of the zones being disposed between the first and second guides on said line, the second of the zones being disposed between the second and third guides on said line, and so on until the last (N−1) of the zones is disposed between the (N−1) guide and the Nth guide;
a plurality of workpieces at least equal to said second plurality, each zone containing at least one workpiece, the workpieces being disposed below said electrode; and means to cause said single wire electrode to cut completely through all of said workpieces simultaneously.

13. A wire guidance arrangement according to claim 12, wherein precentering units for the wire electrode are provided on either side of the two outer wire guides.

14. A wire guidance arrangement according to claim 12, wherein the wire guides at inlet and outlet of the spark erosion zone are longer in the longitudinal direction thereof than the central wire guides.

15. A wire guidance arrangement according to claim 12, wherein several wire electrodes are provided which are parallel to one another.

16. A wire guidance arrangement according to claim 12, wherein the wire guides in each case has a guidance element having a V-groove for receiving the wire electrode.

17. A wire guidance arrangement according to claim 16, wherein the guidance element of each wire guidance member is electrically insulated with respect to its body.

18. A wire guidance arrangement according to claim 17, wherein each guidance element is fixed to a cylindrical reception element, which is in turn held in a tubular insulating member, which is secured in an opening of the body.

19. A wire guidance arrangement according to claim 18, wherein the lower end of the reception member rests on a further tubular insulating member, which is filled with insulating material.

20. A wire guidance arrangement according to claim 12, wherein the individual wire guides are mounted so as to rotate about an axis coinciding with the wire electrode for adapting to the cutting direction.

21. A wire guidance arrangement according to claim 20, wherein the wire guides are fixed to the inside of drums mounted in rotary manner, all of said drums being rotatable by means of a common drive means comprising a motor, a shaft and driving gears.

22. A wire guidance arrangement according to claim 21, wherein the drums are fixed to plates projecting vertically from the base block, said plates being displacable in the longitudinal direction of the wire electrode.

23. A wire guidance arrangement according to claim 15, wherein all the wire guides are arranged on a single guide plate.

24. A wire guidance arrangement according to claim 15, wherein the wire guides for each wire electrode are fixed to its own guide plate, each guide plate being fixed to the base block.

25. A wire guidance arrangement for guiding a single wire electrode of a spark erosion machine, in which several workpieces are simultaneously cut completely through by means of the one wire electrode, comprising a plurality of longitudinally spaced wire guides for guiding the wire electrode in the erosion zone, wherein central wire guides are higher than the wire guides at inlet and outlet ends of the spark erosion zone.

* * * * *